T. C. JOHNSON.
DOUBLE BARRELED SHOTGUN.
APPLICATION FILED APR. 10, 1911.

995,790.

Patented June 20, 1911.

2 SHEETS—SHEET 1.

Witnesses
M. P. Nichols
C. L. Weed

Inventor
Thomas C. Johnson
by Seymour H. Cares
Frederic C. Earl
Attys

T. C. JOHNSON.
DOUBLE BARRELED SHOTGUN.
APPLICATION FILED APR. 10, 1911.
995,790.
Patented June 20, 1911.
2 SHEETS—SHEET 2.
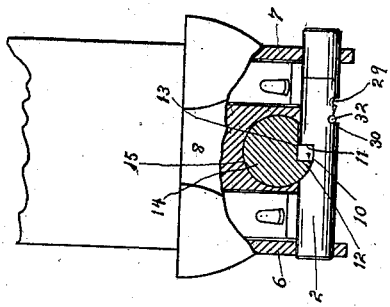
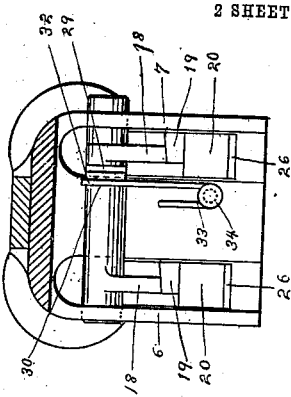
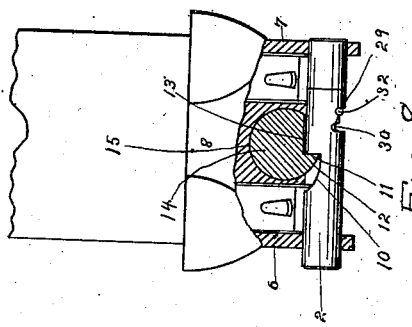
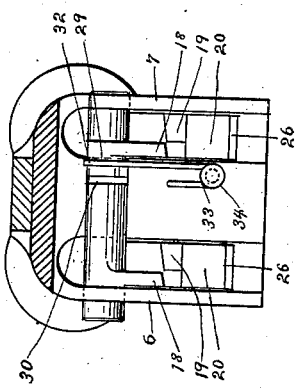
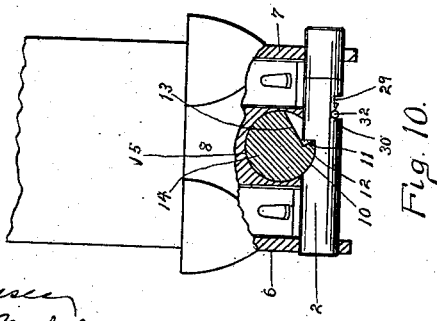
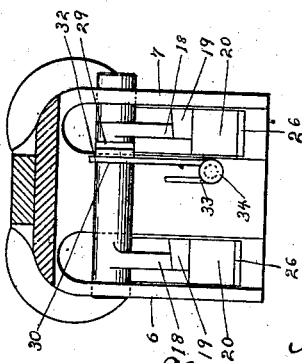

UNITED STATES PATENT OFFICE.

THOMAS C. JOHNSON, OF NEW HAVEN, CONNECTICUT, ASSIGNOR TO WINCHESTER REPEATING ARMS CO., OF NEW HAVEN, CONNECTICUT, A CORPORATION.

DOUBLE-BARRELED SHOTGUN.

995,790. Specification of Letters Patent. Patented June 20, 1911.

Application filed April 10, 1911. Serial No. 620,018.

*To all whom it may concern:*

Be it known that I, THOMAS C. JOHNSON, a citizen of the United States, residing at New Haven, in the county of New Haven and State of Connecticut, have invented a new and useful Improvement in Double-Barreled Shotguns; and I do hereby declare the following, when taken in connection with the accompanying drawings and the letters of reference marked thereon, to be a full, clear, and exact description of the same, and which said drawings constitute part of this specification, and represent, in—

Figure 1:
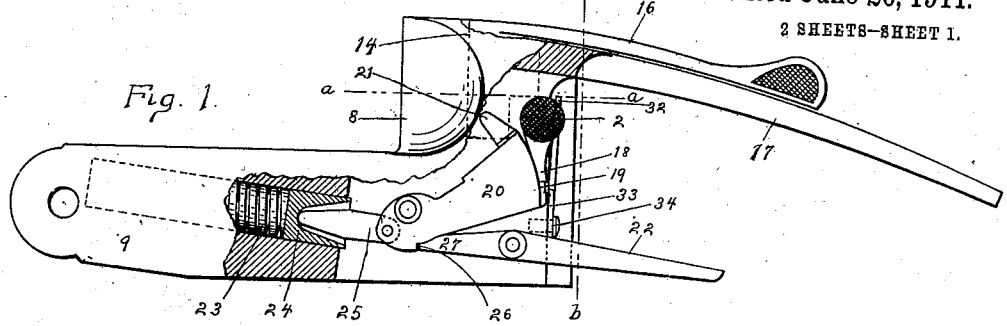
Figure 2:
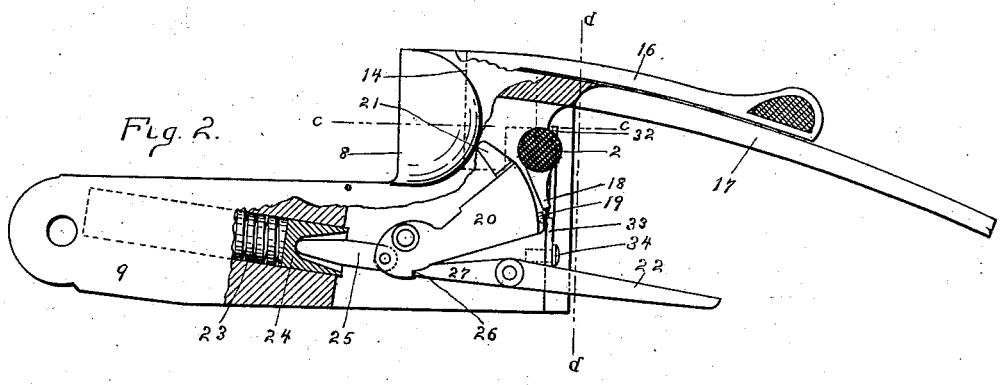
Figure 3:
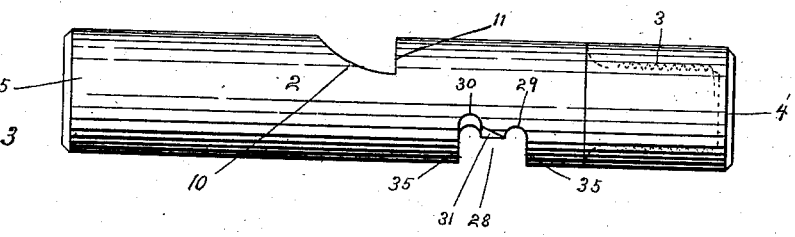
Figure 4:
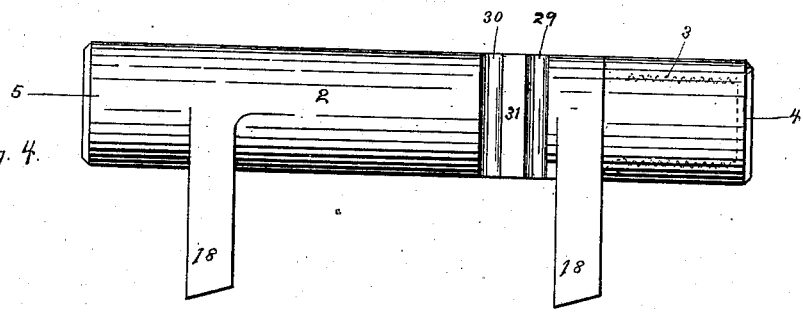

Figure 1 a detailed view partly in left hand side elevation and partly in vertical section of the receiver of a double-barreled shotgun constructed in accordance with my invention, showing the two hammers of the gun locked by the hammer-safety. Fig. 2 a corresponding view showing the hammers unlocked by the hammer-safety. Fig. 3 a detached plan view on an enlarged scale of the hammer-safety. Fig. 4 a detached view thereof in rear elevation on the same scale. Fig. 5 a view of the receiver partly in plan, and partly in horizontal section on the line *a—a* of Fig. 1, looking downward, showing the hammers locked by the hammer-safety; and the breakdown lever in its normal position. Fig. 6 a broken view of the receiver partly in rear elevation and partly in vertical section on the line *b—b* of Fig. 1, looking forward, showing the hammers locked by the hammer-safety and the breakdown lever in its normal position. Fig. 7 a view of the receiver partly in plan and partly in horizontal section on the line *c—c* of Fig. 2, looking downward and showing the hammers as unlocked by pushing the hammer-safety from right to left into its unlocking position, the breakdown lever being in its normal position. Fig. 8 a broken view of the receiver, partly in rear elevation and partly in vertical section on the line *d—d* of Fig. 2 looking forward, and showing the parts in the same positions in which they are shown in Fig. 7. Fig. 9 a broken view partly in plan and partly in horizontal section on the line *a—a* of Fig. 1, showing the locking of both hammers by the hammer-safety when the same is moved into its locking position by the movement of the breakdown lever into its breaking down position. Fig. 10 a view partly in rear elevation and partly in vertical section on the line *b—b* of Fig. 1 looking forward and showing the parts in the positions in which they are shown in Fig. 9.

My invention relates to an improved hammer-safety for double-barreled shotguns, the object being to produce a simple, compact, convenient, durable and reliable hammer-safety constructed with particular reference to being located so as to be unaffected by the shock of recoil and so as to be out of the way of the hand of the user in the ordinary manipulation of the gun, whereas in double-barreled shotguns as ordinarily constructed, the hammer-safety is located close to the rear end of the breakdown lever and therefore where it is liable to be accidentally operated in the operation of the same.

With these ends in view my invention consists in a double-barreled shotgun having certain details of construction and combinations of parts as will be hereinafter described and pointed out in the claims.

In carrying out my invention as herein shown, I employ a rod-like or cylindrical hammer-safety 2 solid at one end but having its opposite end reduced in diameter and threaded to form a stem 3 which receives an internally threaded cap 4 the external diameter of which exactly corresponds to the external diameter of the opposite end 5 of the safety which is provided with the described stem 3 and cap 4 to permit it to be assembled in the side walls 6 and 7 of the gun-frame or receiver 8 which is provided with a forwardly extending arm 9 to which the two barrels of the gun are pivoted in any suitable manner, these barrels not being shown as they have nothing to do with my present invention. The said hammer-safety 2 has formed about midway of its length and in its forward face, a notch 10 having a square left hand wall 11 which is engaged by a tooth 12 entering the said notch 10 and formed by producing a vertical cut 13 in the rear face of the lower end of a heavy stud 14 journaled in a vertical socket 15 in the center of the receiver 8 and forming a trunnion for the breakdown lever 16 the rear end of which extends over the long tang 17 of the said receiver. When the said lever 16 is swung from left to right as required for "breaking down" the gun, by which is meant swinging its two barrels down into their open or charging positions, the tooth 12 of the trunnion 14, by its engagement with the shoulder 11 of the hammer-safety, positively moves the same longitudinally from left to right into the position in which it is shown in Figs. 9 and 10.

The described movement of the safety from left to right, correspondingly moves its two depending locking-fingers 18 from left to right over two locking-lugs 19 formed upon the rear edges of the two hammers 20 which may also be of any approved construction and operation. As shown herein, the hammers 20 are provided with the customary hammer noses 21, sears 22 and springs 23, the latter being connected with the hammers by means of hammer-spring plungers 24 and links 25. The particular construction of the hammers, however, forms no part of my present invention.

At the beginning of the movement of the hammer-safety 2 from left to right, it is oscillated on its longitudinal axis so as to swing its said fingers 18 forward into line with the said lugs 19 upon the hammers 20 and as the lower ends of the fingers 18 and the upper faces of the lugs 19 are beveled, the hammers 20 are slightly depressed by the fingers 18 as the same ride from left to right over the beveled lugs 19 of the hammers. The beveling of the fingers 18 and lugs 19 as described is done so that the hammer-notches 26 may be relieved from their engagement with the noses 27 of the sears 22 when the hammers are locked by the hammer-safety.

To provide for oscillating the hammer-safety 2 as it is longitudinally moved for the purpose of swinging its locking-fingers 18 into their clearance and operating positions, I form a vertical slot 28 in its rear face, this slot being located to the right of the notch 10 in its forward face. At the opposite ends of the bottom of this slot 28, I form parallel semi-circular grooves 29 and 30 separated by a cam-surface 31 and adapted to receive the long arm 32 of a bent wire spring 33 secured by a screw 34 to the receiver 8. In order that the safety 2 may be oscillated by the spring arm 32 as the safety is jumped, so to speak, from the groove 29 to the groove 30, and vice versa, in longitudinally moving the safety, the said grooves 29 and 30 are cut so as to have an angular relation with respect to each other. Thus, supposing the lower ends of the two grooves to be in the same plane, the groove 30 is tilted forward at its upper end from the plane of the groove 29 for a distance sufficient to secure the required oscillation of the safety the movement of which in opposite directions is limited by the co-action of the said spring arm 32 with the end walls 35 of the slot 28.

When the safety 2 is automatically shifted from left to right by the action of the breakdown lever 16, the spring-arm 32 will be jumped from the groove 29 to the groove 30 and the safety 2 oscillated sufficiently to swing its fingers 18 forward into line with the lugs 19 of the hammer 20. Conversely when the safety 2 is manually pushed back from right to left into its retired or unlocked position, the jumping of the spring-arm 32 from the groove 30 to the groove 29 will cause a sufficient oscillation of the safety 2 to swing its fingers 18 rearward clear of the lugs 19 so as to leave the hammers 20 free for firing.

When the gun is broken down by the lever 16, the hammer-safety 2 will be automatically moved from left to right and at the same time oscillated for the co-action of its locking-fingers 18 with the locking-lugs 19 of the hammers 20 and thus lock the same positively in their cocked positions when the gun is open. Now when the gun is closed or "breeched up," the barrels will be swung back into their firing or breeched positions at which time the breakdown lever 16 will, in the usual manner, be automatically swung back into its normal position, but the automatic restoration of the lever 16 to its normal position does not automatically unlock the hammers 20 which are kept locked and safe guarded by the hammer-safety 2 which is left undisturbed by the user of the gun until the moment that it is desired to discharge one or both barrels of the gun. At this time the user of the gun uses his finger or thumb to push the safety 2 from right to left during which movement it is sufficiently oscillated by the co-action of the spring arm 32 with the relatively inclined grooves 29 and 30 to cause the safety to be sufficiently rotated on its longitudinal axis to swing its fingers 18 rearward so as to entirely clear the locking-lugs 19 upon the hammers 20 which are then free to respond to the pulling of the triggers.

I particularly wish to call attention to the simplicity and convenience of my improved safety, and to its location forward of the rear end of the breakdown lever 16 and below the same, so that in any ordinary handling of the gun, the safety cannot be accidentally operated, whereas there is always the danger of prematurely operating the hammer-safety of a double-barreled shot gun when the safety is located, as it generally is in double-barreled shotguns, in the upper tang at a point close to the rear end of the breakdown lever. I also wish to point out that my improved hammer-safety is arranged at a right angle to the axis of recoil and is therefore practically unaffected thereby.

I claim:—

1. In a double-barreled shotgun, the combination with the receiver, breakdown lever and hammers thereof, of a hammer-safety transversely mounted in the receiver, automatically moved into its locking position by the trunnion of the breakdown lever and manually moved into its unlocking position.

2. In a double-barreled shotgun, the combination with the receiver, breakdown lever and hammers thereof, of a longitudinally movable and rotatable hammer-safety positively moved into its locking position by the trunnion of the breakdown lever and having locking-fingers which co-act with the hammers and which are thrown into and out of engagement therewith by the oscillation of the safety which is manually moved into its unlocked position.

3. In a double-barreled shotgun, the combination with the receiver, breakdown lever and hammers thereof, of a hammer-safety mounted in the receiver transversely thereof and formed in its forward face with a notch receiving a portion of the trunnion of the breakdown lever and also adapted to co-act with the hammers, whereby the safety is positively moved into locking position by the said lever and manually moved into its unlocked position.

4. In an automatic shotgun, the combination with the receiver, breakdown lever and hammers thereof, of a hammer-safety transversely mounted in the receiver, formed upon its forward face with a notch to receive a portion of the trunnion of the breakdown lever and upon its rear face with a slot containing two grooves arranged at angles relative to each other, and a spring entering the said slot and co-acting with the said grooves to oscillate the safety as the same is moved into its locked and unlocked positions.

In testimony whereof, I have signed this specification in the presence of two subscribing witnesses.

THOMAS C. JOHNSON.

Witnesses:
FRANK A. PAUL,
DANIEL H. VEADER.

---

Copies of this patent may be obtained for five cents each, by addressing the "Commissioner of Patents, Washington, D. C."